US009291714B2

(12) United States Patent
Vourc'h

(10) Patent No.: US 9,291,714 B2
(45) Date of Patent: Mar. 22, 2016

(54) METHOD AND DEVICE FOR DETECTING AND EXCLUDING MULTIPLE SATELLITE FAILURES IN A GNSS SYSTEM

(75) Inventor: Sebastien Vourc'h, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 446 days.

(21) Appl. No.: 13/821,556

(22) PCT Filed: Aug. 30, 2011

(86) PCT No.: PCT/EP2011/064891
§ 371 (c)(1),
(2), (4) Date: Mar. 7, 2013

(87) PCT Pub. No.: WO2012/031940
PCT Pub. Date: Mar. 15, 2012

(65) Prior Publication Data
US 2013/0169478 A1 Jul. 4, 2013

(30) Foreign Application Priority Data

Sep. 8, 2010 (FR) ...................................... 10 57140

(51) Int. Cl.
*G01S 19/20* (2010.01)
*G01S 19/49* (2010.01)

(52) U.S. Cl.
CPC *G01S 19/20* (2013.01); *G01S 19/49* (2013.01)

(58) Field of Classification Search
CPC ......... G01S 19/20; G01S 19/49; G01S 19/08; G01S 3/02
USPC ................................ 342/357.58, 357.45, 451
See application file for complete search history.

(56) References Cited

U.S. PATENT DOCUMENTS

| 7,219,013 | B1 * | 5/2007 | Young et al. .................. 701/472 |
| 7,689,357 | B2 | 3/2010 | Martin et al. |
| 2003/0117317 | A1 * | 6/2003 | Vanderwerf et al. ..... 342/357.02 |
| 2008/0288167 | A1 * | 11/2008 | Trautenberg et al. ......... 701/214 |
| 2010/0324822 | A1 * | 12/2010 | Coatantiec et al. ........... 701/216 |

FOREIGN PATENT DOCUMENTS

| EP | 1801539 A1 | 6/2007 |
| EP | 1956386 A1 | 8/2008 |
| EP | 2170060 A1 | 11/2009 |

OTHER PUBLICATIONS

Giremus, et al., "A GLR Algorithm to Detect and Exclude up to Two Simultaneous Range Failures in a GPS/Galileo/IRS Case" ION GNSS 20th International Technical Meeting of the Satellite Division, Sep. 25-28, 2007, pp. 2911-2923, Fort Worth, TX.
Lee, et al. "Analysis of Range and Position Comparison Methods as a Means to Provide GPS Integrity in the User Receiver", The MITRE Corporation, Jan. 1, 1986, pp. 1-17, McLean, Virginia.
Parkinson, et al. "Autonomous GPS Integrity Monitoring Using the Pseudorange Residual", Journal of the Institute of Navigation, vol. 35, No. 2, Summer 1988, pp. 255-274, Stanford, California.

* cited by examiner

*Primary Examiner* — Harry Liu
(74) *Attorney, Agent, or Firm* — Blakely Sokoloff Taylor & Zafman LLP

(57) ABSTRACT

According to a first aspect, the invention relates to a method for checking the integrity of position information output by a satellite (GNSS) positioning device (1) including a bank (3) of Kalman filters each producing a navigation solution (dX0, dXi, dXn) from raw measurements of signals transmitted by the satellites, characterized in that the method comprises the steps of, for each filter in the bank: (i) correcting the navigation solution produced by the filter according to an estimate of the impact of a failure of a satellite on the navigation solution; (ii) calculating a cross-innovation reflecting the deviation between an observation corresponding to a raw measurement from a satellite not used by the filter and an a posteriori estimate of said observation from the navigation solution produced by the filter and corrected in accordance with step (i); and (iii) performing a statistical test of the cross-innovation in order to declare whether or not the satellite, the raw measurement of which is not used by the filter, is faulty.

10 Claims, 2 Drawing Sheets

METHOD AND DEVICE FOR DETECTING AND EXCLUDING MULTIPLE SATELLITE FAILURES IN A GNSS SYSTEM

FIELD OF THE INVENTION

The field of the invention is that of carriers using information provided by a satellite navigation system using measurements from several constellations of satellites.

The invention more particularly relates to a satellite positioning device and a method for checking the integrity of position information delivered by such a device, able to detect and to exclude two simultaneous satellite failures.

BACKGROUND OF THE INVENTION

Carriers such as aircraft or further ships have many navigation systems. Among these systems, a hybrid piece of INS/GNSS (Inertial Navigation System/Global Navigation Satellite System) equipment is notably included.

A central inertial unit provides not very noisy and short term accurate information. However, over the long term, the localization performances of a central inertial unit degrade (more or less rapidly depending on the quality of the sensors, accelerometers or gyroscopes for example, and on the processing operations used by the central unit). If pieces of information acquired from a satellite navigation system, as for them, are not very likely to drift over the long term, they are however often noisy and with variable accuracy. Moreover, inertial measurements are always available whereas GNSS information is not always available or is likely to be decoyed and scrambled.

Hybridization consists of combining the pieces of information provided by the central inertial unit and the measurements provided by the satellite navigation system in order to obtain position and speed information by benefiting from both systems. Thus, the accuracy of the measurement provided by the GNSS receiver allows the inertial drift to be controlled and the not very noisy inertial measurements give the possibility of filtering the noise on the measurements of the GNSS receiver.

The model of GNSS measurements, which is known, does not take into account possible satellite failures which affect the clocks or the transmitted ephemerides, these failures being generally apparent in the form of biases or drifts on the GNSS measurements.

Within this scope, integrity checking systems have the purpose of detecting the occurrence of these failures and of excluding the responsible satellites in order to again find a navigation solution no longer containing any non-detected error.

In INS/GNSS hybrid navigation systems, the probability of failure of two satellites in a same constellation is less than the risk of integrity. This event may then be ascribed to the risk of integrity and the system only requires a capability of detecting a single satellite failure. The satellite identified as having failed may then be excluded so as to suppress pollution of the navigation state by the satellite failure.

The multiplication of the satellite constellations dedicated to navigation (GPS, Galileo, Glonass for example) increases the number of satellites which may be used in an INS/GNSS hybrid navigation system. But then the probability of encountering two simultaneous satellite failures will no longer be negligible against the risk of integrity.

Thus, future navigation systems, which will demand higher integrity requirements, will be forced to have capability of detecting and of excluding more than one satellite failure.

Now, present integrity checking techniques only allow detection of a single satellite failure, and these techniques cannot be extended to the double failure case without requiring high computational load.

The article "A GLR Algorithm to Detect and Exclude up to Two Simultaneous Range Failures in a GPS/Galileo/IRS Case" of A. Gerimus and A. C. Escher, ION GNSS 2007, discusses the use of a method for detecting and excluding multiple satellite failures based on the GLR (Generalized Likelihood Ratio) algorithm for detecting two satellite failures. A main drawback of this method lies in the fact that it only uses a single navigation filter and that it will begin by detecting the satellite which has the most significant failure before being able to detect the second faulty satellite, consequently significant errors will be observed on the navigation solution. Further, this method does not give the possibility of suppressing pollution of the navigation state by the first satellite failure, which necessarily impacts the capability of the system of detecting the second satellite failure.

SHORT DESCRIPTION OF THE INVENTION

Therefore, there exists a need for a technique which may be applied with a reduced computational load, which gives the possibility of detecting and efficiently excluding multiple satellite failures, and of correcting the impact of the failures on the navigation solution.

For this purpose, the invention, according to a first aspect, proposes a method for checking integrity of position information delivered by a satellite positioning device comprising a bank of Kalman filters each elaborating a navigation solution from raw measurements of signals transmitted by satellites, characterized in that it includes the steps for each filter of the bank, of:
  (i) correcting the navigation solution elaborated by the filter according to an estimate of the impact of a failure of a satellite on the navigation solution;
  (ii) calculating a cross-innovation reflecting the deviation between an observation corresponding to a raw measurement from a satellite, not used by the filter and an a posteriori estimate of said observation from the navigation solution elaborated by the filter and corrected according to step (i);
  (iii) conducting a statistical test of the cross-innovation in order to declare whether the satellite for which the raw measurement is not used by the filter, is either faulty or not.

Certain preferred, but non-limiting aspects of this method are the following:
  step (i) comprises:
  determining for each satellite at least one likelihood ratio between an assumption of failure of a given nature of the satellite and an assumption of the absence of a failure of the satellite;
  comparing the likelihood ratio associated with a failure of a given nature with a threshold value, and declaring if required a failure of a given nature;
  an estimate of the impact of the declared failure on the navigation solution elaborated by the filter;
  correcting the navigation solution elaborated by the filter according to the estimate of the impact of the declared failure.

it comprises the calculation for each satellite, of a cross-innovation and of a cross-innovation covariance reflecting the deviation between an observation corresponding to a raw measurement from the satellite and an a posteriori estimate of said observation elaborated by a Kalman filter not using the raw measurement from the satellite, the likelihood ratio being determined according to the cross-innovation and to the cross-innovation covariance provided by said Kalman filter not using the raw measurement from the satellite and from an estimate of the impact of the failure of given nature on said cross-innovation.

the impact of the failure of given nature on said cross-innovation is estimated by determining from data provided by said Kalman filter not using the raw measurement from the satellite, a dynamic innovation matrix, and by estimating an amplitude of the failure of a given nature on an estimation sliding window corresponding to a given number of incrementations of said Kalman filter not using the raw measurement from the satellite, the dynamic innovation matrix representing a link between the amplitude of the failure and the deviation induced by the failure on the cross-innovation;

the impact of a failure on a navigation solution is estimated by determining from data provided by the Kalman filter elaborating the navigation solution, a dynamic navigation matrix, and by estimating an amplitude and a covariance of the failure on an estimation sliding window corresponding to a given number of incrementations of said Kalman filter elaborating the navigation solution, the dynamic navigation matrix representing a link between the amplitude of the failure and the deviation induced by the failure on said navigation solution;

the statistical test conducted in step (iii) declares a satellite as having failed when the cross-innovation exceeds a threshold corresponding to $(H \cdot P_i \cdot H^T + R_i) * \alpha$, wherein H represents the observation matrix of the Kalman filter, $P_i$ the matrix for a posteriori estimate of the covariance of the error, $R_i$ the covariance matrix of the measurement noise, and $\alpha$ a coefficient, the value of which is set according to a false detection probability;

the cross-innovation corresponds to the deviation between the pseudo-distance to a satellite delivered by the satellite positioning system and an a posteriori estimate of this pseudo-distance provided by a Kalman filter not using the pseudo-distance delivered by the satellite;

it further comprises the steps:

a satellite declared as having failed so that the raw measurements of said faulty satellite are no longer used by the filters of the bank, excluding the invalidated satellite if, upon expiry of a predetermined time following the invalidation, the statistical test of the cross-innovation always draws the conclusion that said satellite is faulty and no other cross-innovation test has declared the failure of another satellite.

it also applies, for each filter of the bank, an a priori innovation statistical test on each of the satellites used by the filter, and in the case when several satellites are declared as being faulty following the statistical test of their cross-innovation, the satellite not used by the filter having the largest number of a priori innovations for which the statistical test is less than a threshold is invalidated so that the raw measurement from said invalidated satellite is no longer used by the filters of the bank;

each of the filters of the bank elaborates a navigation solution by hybridizing inertial measurements to raw measurements of the signals transmitted by the satellites.

According to a second aspect, the invention proposes a satellite positioning device comprising a bank of Kalman filters each elaborating a navigation solution from raw measurements of signals transmitted by satellites, characterized in that it includes:

a configured accommodation module for estimating, for each filter of the bank, the impact of a failure of a satellite on the navigation solution elaborated by the filter, and correcting, in the case of a failure declaration, the navigation solution depending on the estimate of the impact of the failure;

a module for detecting satellite failures configured for:

calculating, for each filter of the bank, a cross-innovation reflecting the deviation between an observation corresponding to a raw measurement from a satellite, not used by the filter, and an a posteriori estimate of said observation stemming from the navigation solution elaborated by the Kalman filter as corrected by the accommodation module, and conducting a cross-innovation statistical test in order to declare whether the satellite is faulty or not.

SHORT DESCRIPTION OF THE DRAWINGS

Other aspects, objects and advantages of the present invention will become better apparent upon reading the following detailed description of preferred embodiments thereof, given as a non-limiting example, and made with reference to the appended drawings wherein.

DETAILED DESCRIPTION OF THE INVENTION

Within the scope of the invention, a faulty satellite is defined as being a satellite which sends erroneous information in its message, leading to a (set or variable) deviation between its actual position and the position given in its message.

According to the state of the art, a bank of Kalman filters is conventionally used for protection against the possible failure of a satellite. In an INS/GNSS context, these filters produce the hybridization between the information from the satellite navigation system and that from the central inertial unit. One of the filters of the bank of filters, designated by the term of main filter, uses all the GNSS measurements consisting of pseudo-measurements and of information on the quality of the latter. The other so-called secondary filters of the bank of filters only make use of only a portion of the available GNSS measurements (typically all GNSS measurements except for those from one of the satellites; the excluded satellite being different from one secondary filter to the other).

Within the scope of the invention, such an architecture in the form of a bank of filters has the following advantages.

If a satellite failure occurs, the latter is not seen by the secondary filter not receiving this measurement: this secondary filter is therefore not affected by the failure and thus remains unpolluted.

Moreover, if two simultaneous satellite failures occur, two of the secondary filters of the bank (those excluding the measurements from either one of the faulty satellites) are then affected by a single satellite failure.

Figure 1:
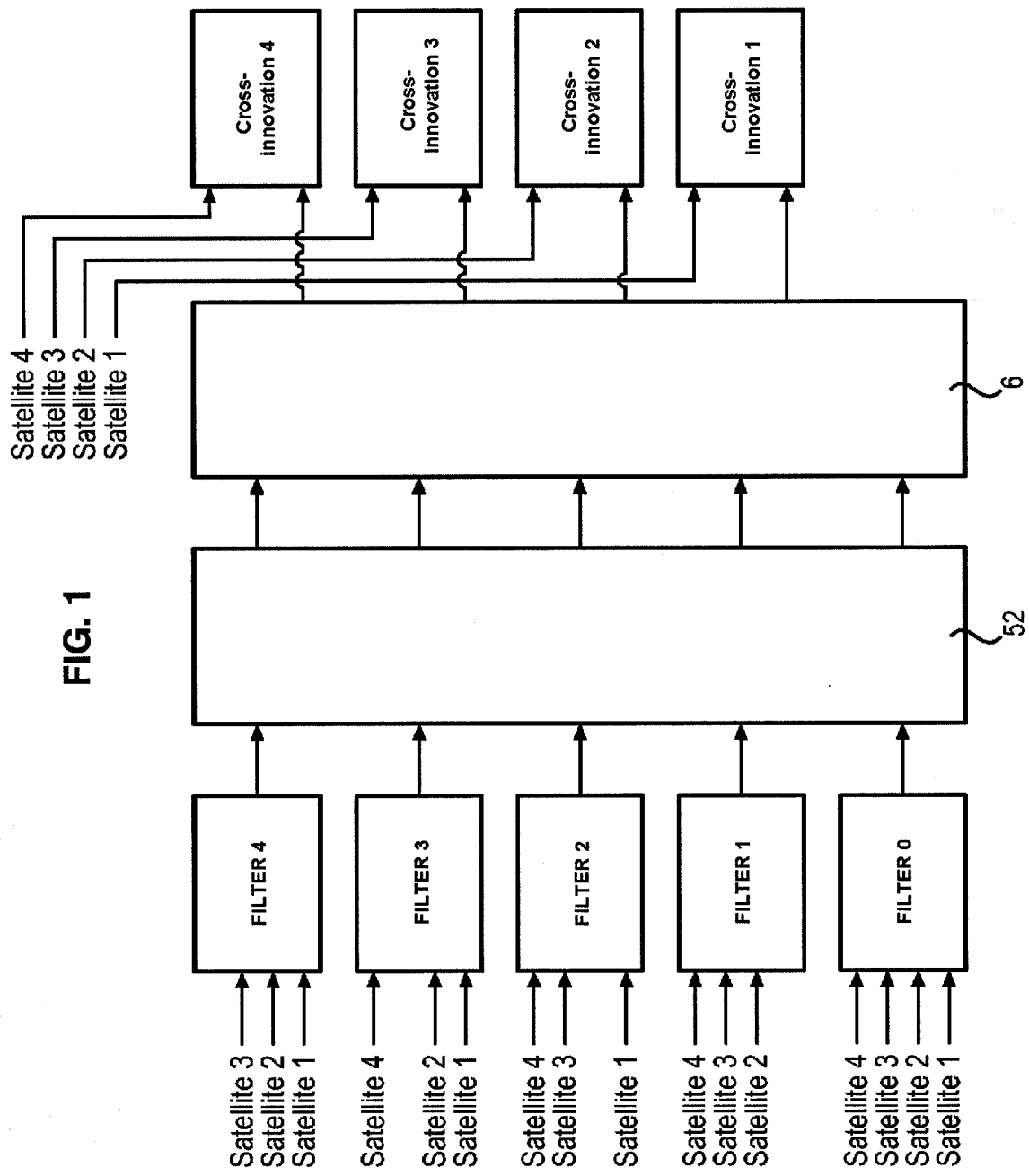
FIG. 1 is a diagram illustrating the operating principle of the invention in the case when two satellites out of four are simultaneously faulty.

In FIG. 1, a bank of Kalman filters is illustrated, comprising a main filter FILTER 0 using the measurements from four satellites, and four secondary filters FILTER 1, FILTER 2, FILTER 3 and FILTER 4 each excluding the measurements from one of the satellites. Assuming that the satellites 1 and 4 are simultaneously faulty, it is understood that the secondary filters FILTER 1 and FILTER 4 are only affected by a single satellite failure (the one due to the satellite 4 and the one due to the satellite 1, respectively).

Figure 2:
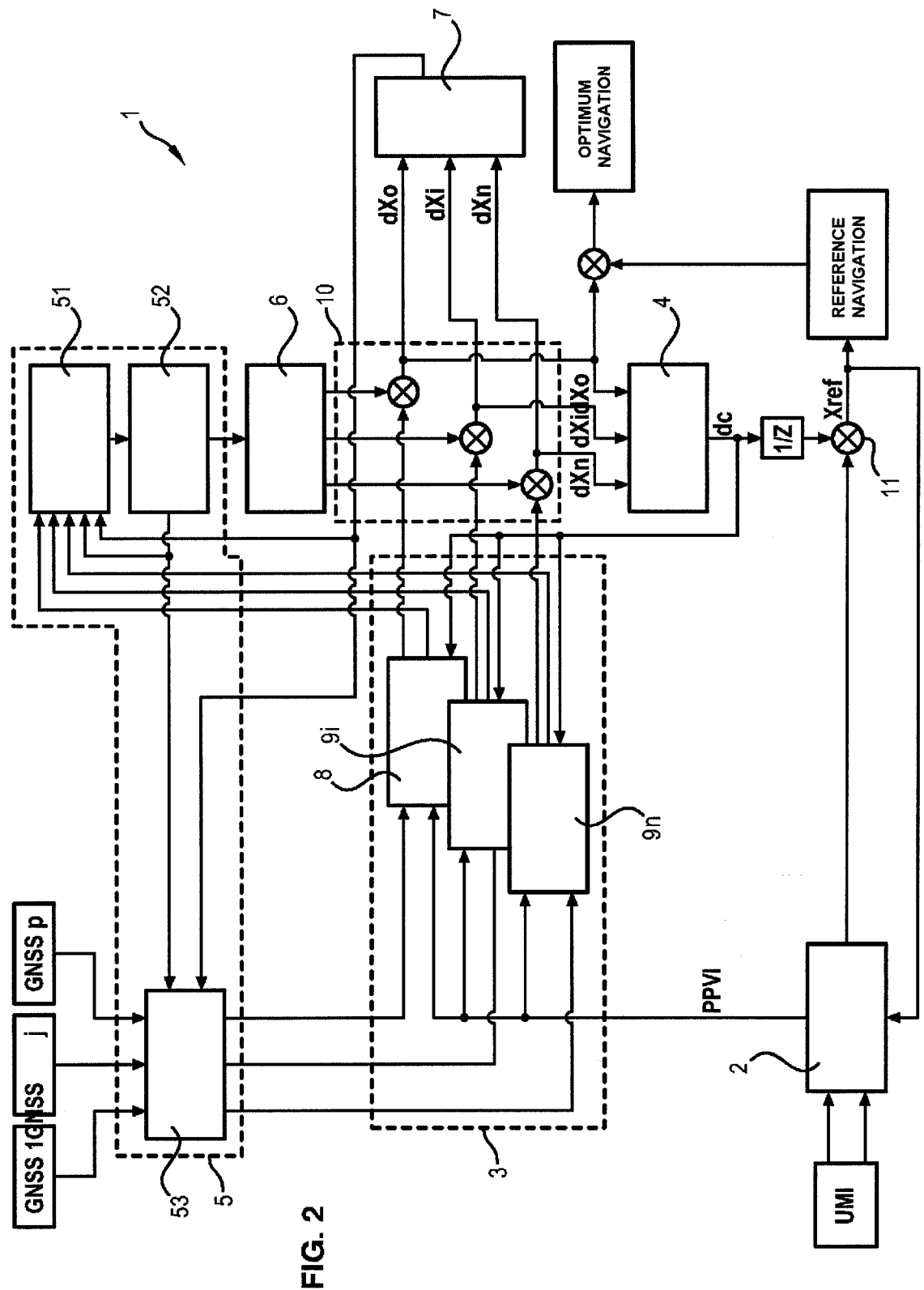
FIG. 2 is a diagram representing a possible embodiment of a device according to the second aspect of the invention.

With reference to FIG. 2, a satellite positioning device 1 is illustrated, according to a possible embodiment of the second aspect of the invention, intended to be loaded on board a carrier such as an aircraft. The device 1 uses information provided by a central inertial unit UMI and by several navigation systems by means of satellites GNSS 1, GNNS j, GNSS p, and comprises a single virtual platform 2 and a bank 3 of Kalman filters. The invention is however not limited to an INS/GNSS navigation system but also extends to a GNSS context alone.

The virtual platform 2 receives inertial increments from sensors (gyroscopes, accelerometers) of the central inertial unit UMI. The inertial increments notably correspond to angular increments and to speed increments. Pieces of inertial navigation information (such as altitudes, course, speed or position of the carrier) are calculated by the virtual platform 2 from these increments. These pieces of inertial navigation information are subsequently designated as inertial PPVI measurements.

These inertial PPVI measurements are transmitted to a device for calculating pseudo-distances estimated a priori (not shown in FIG. 1), which also receives data on the position of the satellites. From inertial measurements on the one hand and from others by data on the position of the satellites, the device for calculating a priori estimated pseudo-distances calculates the a priori pseudo-distances between the carrier and the different satellites visible from the carrier.

The device 1 also receives pseudo-measurements between the carrier and the different visible satellites from several constellations GNSS 1, GNSS j, GNSS p. The deviations (called observations) are then conventionally calculated between the a priori estimated pseudo-measurements and the pseudo-measurements delivered by each of the GNSS constellations.

The bank of Kalman filters 3 achieves hybridization between the inertial pieces of information from the central inertial unit 2 and the pieces of information from satellite navigation systems. In addition to a function providing statistical information on the measurements at the output, the role of the filters is to keep the virtual platform 2 in a linear operating domain, which is a picture of the one modeled in the Kalman filter by each estimating a state vector dX0-dXn (as a general rule, including about 30 components).

In a conventional way known per se, the bank of filters 3 includes several Kalman filters in parallel. One of the filters is called a main Kalman filter 8: it takes into account all the observations (and, for doing this, receives all the measurements from the GNSS system) and elaborates a main hybrid navigation solution.

The other filters 9i, 9n are called secondary filters: they only take into account part of the observations, for example (n−1) observations from among the n observations relative to the n visible satellites so that the $i^{th}$ secondary Kalman filter 9i receives from the GNSS system the measurements of all the satellites except from the $i^{th}$ satellite, and each elaborates a secondary hybrid navigation solution.

It will be noted that the process for elaborating the observations, described above, is not common to all the filters of the bank 3, but is accomplished for each of the filters. Thus, the calculation of the a priori pseudo-distances and the calculation of the observations which are mentioned above, are not common to all the filters of the bank, but the hybridization device 1 according to the invention performs these calculations for each filter of the bank.

The device 1 elaborates a hybrid output Xref (Reference Navigation) corresponding to the inertial PPVI measurements calculated by the virtual platform 2 and corrected, via a subtractor 11, by a stabilization vector dC having as many components as there are state vectors estimated by the Kalman filters.

It will be noted that within the scope of a closed loop hybridization device, the hybrid output Xref is looped back to the input of the virtual platform 2.

Moreover, as this is illustrated in FIG. 1, the stabilization vector dC may be applied to the input of the whole of the filters of the bank of filters. In such a way, the Kalman filters adjust by subtracting from their estimate (state vector dX), the correction dC, and are thus maintained consistent with the virtual platform.

The device 1 further includes a module 4 for elaborating the stabilization vector dC, two embodiments of which are indicated hereafter as non-limiting examples.

According to a first possible embodiment, the corrections to be applied to the inertial measurements stem from a single filter. Thus, the stabilization filter dC is equal, in all of its components, to the state vector estimated by a Kalman filter selected from among the filters of the bank 3. The selection is made for example within the module 4 according to document EP 1801539 A by detecting a possible satellite failure.

According to a second possible embodiment, the stabilization vector dC is elaborated, component by component, by using for each component the whole of the Kalman filters. The module 4 for elaborating the correction dC is then configured in order to elaborate each of the components dC[state] of the stabilization vector dC according to the whole of the corresponding components dX0[state]-dXn[state] of the correction vectors dX0-dXn. The elaboration of each of the components is for example performed according to patent application WO 2010070012 in the name of the Applicant.

The device 1 moreover includes a module 5 for correcting the navigation state comprising a detection module 52 configured so as to apply the steps of:

determining, for each satellite, at least one likelihood ratio Ir, Ir' between an assumption of a failure of a given nature of the satellite and an assumption on the absence of failure of the satellite, declaring a failure of given nature on a satellite according to the likelihood ratio Ir, Ir' associated with its failure and to a threshold value.

Advantageously, for each satellite, at least one likelihood ratio Ir, Ir' is determined at each incrementation of the Kalman filter on a storage sliding window, and a failure of regular nature is declared if the sum of the likelihood ratios Ir, Ir' associated with this failure on the storage gliding window is greater than the associated threshold value.

A likelihood ratio is representative of the probability that the failure of a given nature which is associated with it, affects the corresponding satellite. For example, if a likelihood ratio associated with a failure of a given nature, is positive, it is more probable that said failure affects the corresponding satellite. The higher a likelihood ratio, the greater is the probability that its corresponding satellite be corrupted by the failure which is associated with it.

The threshold value may be the same for several satellites and/or for several natures of failure, or else the threshold values may be different for each satellite and for each nature of failure, in which case each likelihood ratio or advantageously each sum of likelihood ratios, is compared with a threshold value which is specific to it.

The size of the sliding storage window may vary depending on the nature of the failure, or else a single sliding window size may be provided.

As this will be detailed subsequently, the module 5 for detecting and excluding satellite failures also applies a function for managing and excluding GNSS measurements for monitoring them. In the embodiment illustrated in FIG. 1, the detection and exclusion module 5 thus comprises a module 53 for managing the satellite signals, which receives the GNSS measurements and routes this information to the different filters of the bank 3 depending on the circumstances (no satellite detected as being faulty; exclusion of a satellite detected as being faulty). As this will be explained subsequently, the detection and exclusion module 5 may also utilize for doing this the results of tests of cross-innovations elaborated by a module 7 for detecting satellite failures, and the results of the tests elaborated by a detection module 52.

The module 53 for managing the satellite signals advantageously applies a preselection of the GNSS measurements to be used, capable of optimizing the performance of the system and of limiting the number of measurements. Indeed, even if the use of all the measurements gives the possibility of obtaining optimum performance, the selection of n measurements (where n corresponds to the number of secondary filters each using n−1 GNSS measurements) in GPS, Galileo, Glonass, constellations etc., minimizing different precision criteria (such as DOP—Dilution of Precision, EHE—Expected Horizontal Error or EVE—Expected Vertical Error, for example) gives the possibility of obtaining better output performances than if a single constellation was used and sufficient for ensuring the selected mission.

The device 1 also comprises an accommodation module 6 configured for applying, for each filter of the bank, the steps for:

estimating the impact of a failure of a satellite on the hybrid navigation solution elaborated by the filter, and if a failure is declared, correcting the navigation solution according to the estimate of the impact of the failure.

The accommodation module 6 thus has the function of evaluating the deviations $\Delta X$, $\Delta X_i$, ..., $\Delta X_n$ induced by a failure on the hybrid navigation solutions elaborated by the Kalman filters 8, 9i ... 9n and of correcting the hybrid navigation solutions, for example by means of a bank of subtractors 10. The invention is however not limited to the architecture illustrated in FIG. 1, the estimation of the impact of the failure on the hybrid navigation solutions may be made alternatively by Kalman filters, by the detection module 52 or further by any other means known to the person skilled in the art.

It will be noted that the modules 5 and 6 are compliant with those described in the patent application filed in France on Jul. 10, 2009 under No. 0954849 in the name of the applicant.

Calculation methods developed by the applicant and already discussed in this patent application FR 0954849 are described hereafter in order to determine the likelihood ratios and the impact of a failure on the hybrid navigation solution. These formulae are given as an illustration and by no means form a limitation of the invention.

Advantageously, the likelihood ratios are determined according to data provided by the Kalman filters in particular comprising innovations and innovation co-variances, and from an estimate of the impact of the failure of a given nature on the innovations.

By innovation is meant a deviation between an a priori observation by a Kalman filter and an a posteriori estimate of this observation elaborated by the filter.

Each filter therefore delivers n innovations, as many as there are satellites in the constellation.

In particular, the innovation provided by each secondary Kalman filter 8i is called a "cross-innovation" representing the deviation between an a priori observation stemming from the satellite, the secondary filter of which 8i does not receive the data, and an a posteriori estimate of this observation. The bank of Kalman filters thus delivers n*(n+1) innovations, n of which are cross-innovations.

Advantageously, the module 5 for detecting and excluding satellite failures comprises a module 51 for selecting innovations, configured so as to select innovations (either cross-innovations or not) and innovation covariances and route them towards the module 52 calculating the likelihood ratios.

Advantageously, the module 51 is configured so as to transmit cross-innovations, or conventional innovations, to the module 52 for the calculation of likelihood ratios. The advantage of using a cross-innovation, as compared with conventional innovation tests is that the filter which allows testing of a faulty satellite, is not perturbed by the failure.

In particular, the $i^{th}$ secondary Kalman filter 9i receives from the GNSS system, the measurements of all the satellites except from the $i^{th}$, and thereby elaborates the vector of states dXi independently of the satellite i, so that this filter 8i is not perturbed by a possible failure affecting the satellite i.

The cross-innovation of a satellite for example corresponds to the deviation between the pseudo-distance to said satellite delivered by the satellite positioning system and an a posteriori estimate of this pseudo-distance provided by a Kalman filter not using the pseudo-distance delivered by the satellite, so that this estimation is independent of the satellite. The calculation of the likelihood ratio will therefore not be perturbed by a failure, and notably by a slow failure, of the satellite.

It is specified here that the cross-innovation may generally be applied to any raw measurement, for example a pseudo-speed measurement (also called a Doppler measurement).

Preferentially, the likelihood ratio lr associated with a failure of a given nature is determined at a given instant t, for each satellite, by the following formula:

$$lr_t = \epsilon_t^T S_t^{-1} \epsilon_t - (\epsilon_t - \rho_t)^T S_t^{-1} (\epsilon_t - \rho_t)$$

wherein:

$\epsilon_t$ represents an innovation (a conventional or advantageously a cross-innovation) from a Kalman filter 8i at instant t $S_t$ represents the covariance of the innovation at instant t, and $\rho_t$ represents the deviation due to the failure on said innovation at instant t, $^T$ represents the transposition of a matrix or a column vector $\rho_t$ is unknown, but it may be estimated on a sliding estimation window.

Preferentially, the deviation due to the failure on the hybrid evaluation solution elaborated by said Kalman filter is estimated in parallel, a deviation which will be noted as $\beta_t$. These estimations may be applied according to the following formulae:

$$\rho_t = \phi_t^T \hat{v}_t$$

$$\beta_t = \mu_t^T \hat{v}_t$$

wherein:

$\hat{v}_t$ is an estimation of the amplitude of the failure, $\phi_t$ is a dynamic innovation matrix, representing a link between the amplitude of the failure and the deviation induced by the failure on the innovation, and $\mu_t$ is a dynamic navigation matrix, representing a link between the amplitude of the failure and the deviation induced by the failure on the hybrid navigation solution.

Both dynamic matrixes at instant t are advantageously calculated by the detection module 52 from data provided by said Kalman filter, preferentially in a crossed recursive way, i.e. at any instant t, $\phi_t$ and $\mu_t$, are calculated depending on $\phi_{t-1}$ and $\mu_{t-1}$.

Said data provided by the Kalman filter may comprise a Kalman gain and observation and transition matrices.

The estimation of the amplitude of the failure is advantageously made on a sliding estimation window corresponding to a given number N of implementations of the Kalman filter.

According to an advantageous alternative, the estimation may be made by a least square estimation on the sliding estimation window, preferentially with the following formula:

$$\hat{v}_t = (\Sigma_{i=t-N+1}{}^t \phi_i S_i^{-1} \phi_i^T)^{-1} \cdot (\Sigma_{i=t-N+1}{}^t \phi_i S_i^{-1} \epsilon_i)$$

Advantageously, the given number N of incrementations of the Kalman filter corresponds to a duration shorter than a predetermined detection delay T. In particular, by noting as $\delta$ the implementation period of the Kalman filter, the sliding estimation window should verify: $N \cdot \delta \leq T$.

This sliding estimation window is advantageously the same as the windows for storing the likelihood ratios associated with the failure.

This detection delay gives the possibility of limiting the size of the sliding estimation window and thus limiting the computational load.

If a satellite is declared as faulty, the estimate of the deviations evaluated by the module 6 at instant t on the hybrid evaluation solution elaborated by each Kalman filter 8i is:

$$\Delta X_i = \beta_t = \mu_t^T \hat{v}_t$$

wherein $\beta_t$ was calculated from the innovation using an a priori observation of the satellite declared as faulty. The module 51 for selecting innovations is advantageously configured so that in this case, only these innovations are provided to the detection module 52 and to the accommodation module 6. Thus, by selecting the innovations, it is possible to estimate the impact of a detected failure from innovations using information provided by the satellite declared as faulty.

Moreover, the deviation on the covariance $P_i$ of the error associated with the hybrid navigation solution elaborated by the Kalman filter 8i is also estimated with the following formula:

$$\Delta P_i = \mu_t^T \hat{P}_t \mu_t$$

wherein $\hat{P}_t$ is the covariance of the fault estimated at instant t $\hat{v}_t$.

Preferentially, the detection module 52 is capable of storing the likelihood ratios of each satellite and for each failure of a given nature on the sliding storage window. The estimations of the impact of the failure on the hybrid navigation solutions provided by the filters are removed at the bank of subtractors 10.

According to an advantageous alternative, two likelihood ratios Ir, Ir' are determined for each satellite, one ratio Ir being associated with assumption of a failure of a biased nature and the other ratio Ir' being associated with an assumption of a failure of the ramp nature.

In particular, the dynamic innovation matrix determined for each incrementation of a Kalman filter is different for a failure of the biased or ramp nature. For each satellite, both likelihood ratios Ir, Ir' are therefore different.

With the invention, it is thus possible to differentiate the occurrence of a failure of the biased nature or else of a failure of the ramp nature.

If a failure of a biased nature is detected, the step for estimating the impact of the failure on the hybrid navigation solution is advantageously carried out on a sliding estimation window from the instant of declaration of the failure of a biased nature. Thus, if a failure of the biased type is detected, the sliding estimation window is left active for a determined time, sufficient for estimating the characteristics of the failure.

Advantageously, the estimate of the characteristics of the failure of the biased type depends on the instant of occurrence of the failure, i.e. on the instant when the sum of the likelihood ratios, associated with the failure of the biased type has exceeded its associated threshold value. Exclusion of the measurements by the module 53 is then only implemented after this estimate.

If a failure of the ramp type is detected, the estimate of the impact of the failure on the hybridization solution is preferentially made on the sliding estimation window preceding the instant of declaration of the failure of the ramp nature.

Advantageously, if several sums of likelihood ratios Ir, Ir' are greater than their associated threshold values, a single failure is declared by the detection module 52. This failure corresponds to the largest of the sums of likelihood ratios for the whole of the contemplated failures on the whole of the satellites.

Thus, if two satellites may be declared as faulty, only the most probable failure is actually declared and if two failures of different nature may be declared, only the most probable failure is actually declared.

Assuming again that the satellites 1 and 4 are each simultaneously affected by a failure, it was possible to see that the secondary filters FILTER 1 and FILTER 4 excluding the measurements from one of its satellites 1 and 4 are only affected by a single satellite failure. Consequently, the hybrid navigation solution elaborated by each of these filters is corrected as indicated earlier from the impact of the single satellite failure affecting them. A sound navigation solution is thereby obtained for both of these filters affected by a single satellite failure.

The device 1 further includes a module 7 for detecting and excluding satellite failures, configured so as to apply the steps consisting in:

calculating for each filter of the bank, a cross-innovation reflecting the deviation between an observation corresponding to a raw measurement from a satellite not used by the filter and an a posteriori estimation of said observation from the navigation solution elaborated by the filter and corrected by the accommodation module 6 via the subtractor 10, so that this estimate is independent of the satellite which is desirably tested, conducting a statistical test of the cross-innovation in order to declare whether the satellite is faulty or not.

It will be noted that this module 7 is compliant with the one described in the patent application filed in France on Mar. 24, 2009 under No. 0951894 in the name of the Applicant.

Again taking the example of FIG. 1, both filters FILTER 1 and FILTER 4 initially affected by a single satellite failure after correction by means of the accommodation module 6, have a sound navigation solution. Both of these filters then give the possibility of constructing two cross-innovation tests which will allow detection and direct identification of the two faulty satellites.

The present invention thus advantageously combines the advantages of the methods proposed in patent applications FR 0954849 and FR 0951894, by using the capability of accommodating the navigation state in the case of a satellite failure of the method proposed in FR 0954849 in order to guarantee that the cross-innovation of a faulty satellite is based on a sound filter (i.e. not affected by the failure). Indeed, in a filter bank architecture, two different filters of the bank only contain a single faulty satellite; by using the accommodation of the state, proposed in FR 0954849, it is possible to maintain both of these filters in a domain close to the failure-free state, which gives the possibility of guaranteeing that the interpretation of the cross-innovation tests proposed in FR 0951894 may give rise to identification of the two faulty satellites.

It will be noted that the invention is not limited to the detection and exclusion of two simultaneous satellite failures, but extends to the detection and exclusion of multiple simultaneous satellite failures insofar that the bank of filters has filters exclusively affected by a single one of the multiple satellite failures. Taking the example of three simultaneous satellite failures, it will be possible to again find, in a bank of filters consisting of secondary filters using n–2 GNSS measurements from the n available measurements, secondary filters affected by a single one of the three failures. After accommodation, the navigation solution provided by these filters will be sound, guaranteeing interpretation of the cross-innovation test.

The calculation methods developed by the applicant and already discussed in patent application FR 0951894 are taken up again hereafter for achieving detection and exclusion of satellite failures based on the tests of cross-innovations of the satellites not used and tests of innovations of the satellites used at the moment of the hybridization by each filter from the bank of filters.

Each filter not using a satellite tests the innovation of this satellite (called a cross-innovation) from the position provided by this filter and corrected as a result of the accommodation. It is thereby possible to detect a satellite failure with the filter not using the faulty satellite. The advantage as compared with conventional innovation tests is that the filter which allows testing of a faulty satellite is not perturbed by the failure.

Indeed, the $i^{th}$ secondary Kalman filter $9i$ receives from the GNSS system (via the correction module 5 if required) the measurements of all the satellites except of the $i^{th}$, and thus elaborates the vector of states dXi independently of the satellite i, so that this filter $9i$ is not perturbed by a possible failure affecting satellite i.

The cross-innovation of a satellite for example corresponds to the deviation between the pseudo-distance to said satellite $PR_i$ delivered by the satellite positioning system and an a posteriori estimate $\hat{PR}_i$ of this accommodated pseudo-distance provided by an Kalman filter (i.e. for which the hybrid navigation solution has been corrected via the accommodation module depending on the estimate of the impact of a failure of the satellite on the hybrid navigation solution) not using the pseudo-distance delivered by the satellite, so that this estimate $\hat{PR}_i$ is independent of the satellite which is desirably tested. The result of the test will therefore not be perturbed by a failure, and notably by a slow failure of the satellite.

It is specified here that the cross-innovation may generally be applied to any raw measurement, for example a pseudo-speed measurement (also called a Doppler measurement).

Referring back to the example of a cross-innovation applied to a pseudo-distance, the cross-innovation of the satellite of index i is noted as $Inno_i$:

$$Inno_i = PR_i - \hat{PR}_i = H(X_i) - H(\hat{X}_i), \text{ wherein}$$

H corresponds to the observation model of the Kalman filter, $X_i$ corresponds to the actual unknown position of the carrier, $\hat{X}_i$ corresponds to the position of the carrier as estimated with the $i^{th}$ secondary Kalman filter $9i$ after accommodation.

By linearizing the preceding equation by a development of the observation matrix H to the first order: $Inno_i = \dot{H}(\hat{X}_i) \cdot (X_i - \hat{X}_i)$, wherein $\dot{H}$ designates the first order derivative of H.

The statistic of the error $(X_i - \hat{X}_i)$ on the position being known from the Kalman filter (it is noted as Pi hereafter), the statistical test for example consists of confronting the cross-innovation to a threshold depending on its covariance and taken to be equal to $(H \cdot P_i \cdot H^T + R_i)^* \alpha$, wherein H represents the observation matrix of the Kalman filter, $P_i$ the a posteriori estimation matrix of the covariance of the error, $R_i$ the covariance matrix of the measurement noise, and $\alpha$ a coefficient for which the value is set depending on the false detection probability.

A satellite is then declared as being faulty when its cross-innovation exceeds the threshold shown above. Again taking the example from FIG. 1 (simultaneous failures affecting satellites 1 and 4), it will be retained in this matter that the cross-innovations elaborated for the satellites 1 and 4 affected by a failure, diverge faster than the cross-innovations elaborated for the satellites 2 and 3 not affected by a failure.

In order to achieve the exclusion function, the module 7 may further be configured for:
  invalidating a satellite declared as being faulty so that the raw measurements of said faulty satellite are no longer used by the filters of the bank,
  excluding the invalidated satellite if, upon expiry of a predetermined delay TE following invalidation, the statistical test of the cross-innovation of said satellite always drawing the conclusion of the failure of said satellite, and that no other cross-innovation test has reported the failure of another satellite.

Thus, when a satellite is detected as faulty, this satellite is further monitored for a time TE. This satellite, of index i for example, will no longer be used by all the filters but will continue to be tested by the filter $9i$ which does not hybridize it via the cross-innovations tests (the fact of invalidating the suspected satellite does not actually modify anything of the operation of the filter $9i$ not using this satellite). The advantage of invalidating the suspected satellite during the exclusion method is that there is no ambiguity on the selection of the satellite to be excluded, in fact it will be excluded from the beginning of TE (at the detection moment). Thus, the value of the duration TE does not have any influence in the majority of the cases on the performances of the hybridization device.

According to a possible embodiment, in the case of declaration of failure of a new satellite during the delay TE, the formerly invalidated satellite is validated so that these raw data are again used by the filters of the bank, and the new faulty satellite is invalidated. Thus a change of suspected satellites is achieved when, in spite of the invalidation of the first satellite, another cross-innovation exceeds the threshold (which is not supposed to happen assuming that the first satellite was actually the faulty one).

According to another possible embodiment, a statistical test of the a priori innovation of each of the satellites used by the filter is also conducted for each filter of the bank. The question for example is to conduct a Gaussian test of the innovations (constrained by a probability $\beta$) for the satellites used by each filter.

These so-called conventional innovation tests may contribute to selecting the filter not using the faulty satellite when several cross-innovations exceed a threshold. Actually, it may happen that a failure of a satellite sufficiently perturbs the position of one or several filters using it so that their cross-innovations also exceed this threshold. The proper satellite from among several possible satellites then has to be invalidated. In this embodiment, the selection of the satellite to be invalidated is facilitated by taking into account conventional innovation tests which allow evaluation of the relevance of each of the filters. The most reliable filter will be the one which has the largest number of conventional innovations below the threshold.

Thus, in the case when several satellites are declared as being faulty following the statistical test of their cross-innovation, the satellite not used by the filter having the largest number of a priori innovations for which the statistical test is less than a threshold is invalidated so that the raw measurement of said invalidated satellite is no longer used by the filters of the bank.

It may also happen that several satellites are declared as being faulty following the statistical test of their cross-innovation and that there exist several filters not using these satellites having the same largest number of a priori innovations, for which the statistical test is below a threshold.

In this case, the selection of the faulty satellite to be invalidated may then be made by considering the satellite giving the largest normalized cross-innovation in absolute value, while providing the results of the cross-innovation tests to the module 53 for managing satellite signals. Alternatively, and as this is also illustrated in FIG. 2, this selection may also be made by the module 53 for managing satellite signals by utilizing the results of the tests elaborated by the detection module 52.

According to another aspect of the invention, in the case of declaration of a failure of a satellite, a partial reset may be carried out of the filters of the bank using the excluded satellite, notably by resetting the states related to the measurements received from the GNSS system and the states related to the other sensors used (such as the barometer), and by de-sensitizing the states affected by the failure by adding state noise, this in order to have the relevant filters converge again towards a sound solution if the satellite being detected as faulty is actually the satellite with a failure.

It will be noted that this type of reset may be carried out during the declaration of failure of a satellite, or during a change of identification of the faulty satellite during the period TE.

Alternatively, the reset of the filters of the bank may be performed via the accommodation module 6 which will then correct the impact of a declared failure by using in order to do this, the results of the cross-innovation tests elaborated by the module 7 for detecting satellite failures, these results of the tests being, in order to do this, re-looped to the module 51 for selecting innovations as illustrated in FIG. 2.

The invention notably has the following advantages.

The bank of filters has a conventional architecture: it is not necessary to add an additional bank of filters in order to be able to identify two simultaneous satellite failures.

A single filter is used for integrating the measurements from several GNSS constellations.

The use of the tests of cross-innovations allows direct identification of the faulty satellites.

The accommodation allows suppression of the pollution of the navigation state without any complete reset of the bank of filters.

The invention claimed is:

1. A method for checking the integrity of position information delivered by a satellite positioning device (GNSS) comprising a bank of Kalman filters each providing a navigation solution (dX0, dXi, dXn) from raw measurements of signals transmitted by satellites, characterized in that for each filter of the bank, it includes the steps of:
   determining for each satellite at least one likelihood ratio (lr, lr') between an assumption of a failure of a predetermined type of the satellite and an assumption of absence of failure of the satellite;
   comparing the likelihood ratio (lr, lr') associated with the failure of the predetermined type with a threshold value, and if required declaring the failure of the predetermined type;
   estimating an error induced by the declared failure on the navigation solution provided by the filter,
   (i) correcting the navigation solution provided by the filter according to said estimate of the error induced by said on the navigation solution;
   (ii) calculating a cross-innovation reflecting the deviation between an observation corresponding to a raw measurement from a satellite not used by the filter and an a posteriori estimate of said observation from the navigation solution provided by the filter and corrected according to step (i);
   (iii) conducting a statistical test of the cross-innovation in order to declare whether the satellite, for which the raw measurement is not used by the filter, is faulty or not.

2. The method according to claim 1, comprising the calculation for each satellite of a cross-innovation and of a cross-innovation covariance reflecting the deviation between an observation corresponding to a raw measurement from the satellite and an a posteriori estimate of said observation provided by a Kalman filter not using the raw measurement from the satellite, the likelihood ratio (lr, lr') being determined according to the cross-innovation and to the cross-innovation covariance provided by said Kalman filter not using the raw measurement from the satellite and from an estimation of the error induced by the failure of the predetermined type on said cross-innovation.

3. The method according to claim 2, wherein the error induced by the failure of the predetermined type on said cross-innovation is estimated by determining, from data provided by said Kalman filter not using the raw measurement from the satellite, a dynamic innovation matrix, and by estimating an amplitude of the failure of the predetermined type on a sliding estimation window corresponding to a given number (N) of incrementations of said Kalman filter not using the raw measurement from the satellite, the dynamic innovation matrix representing a link between the amplitude of the failure and the deviation induced by the failure on the cross-innovation.

4. The method according to claim 1, claim 2 or claim 3, wherein the error induced by a failure on a navigation solution is estimated by determining, from data provided by the Kalman filter providing the navigation solution, a dynamic navigation matrix, and by estimating an amplitude and a covariance of the failure on a sliding estimation window corresponding to a given number of incrementations of said Kalman filter providing the navigation solution, the dynamic navigation matrix representing a link between the amplitude of the failure and the deviation induced by the failure on said navigation solution.

5. The method according to claim 1, wherein the statistical test conducted in step (iii) declares a satellite as being faulty when the cross-innovation exceeds a threshold corresponding to $(H \cdot P_i \cdot H^T + R_i) * \alpha$, wherein H represents the observation matrix of the Kalman filter, $P_i$ the a posteriori estimation matrix of the covariance of the error, $R_i$ the covariance matrix of the measurement noise, and α a coefficient for which the value is set according to a false detection probability.

6. The method according to claim 1, wherein the cross-innovation corresponds to the deviation between the pseudo-distance to a satellite delivered by the satellite positioning system and an a posteriori estimation of this pseudo-distance provided by a Kalman filter not using the pseudo-distance delivered by the satellite.

7. The method according to claim 1, further comprising the steps of:
   invalidating a satellite declared as being faulty so that the raw measurements of said faulty satellite are no longer used by the filters of the bank,
   excluding the invalidated satellite if upon expiration of a predetermined delay following the invalidation, the statistical test of the cross-innovation always draws the conclusion that said satellite has failed and no other cross-innovation tests has declared the failure of another satellite.

8. The method according to claim 1, also applying, for each filter or bank, a statistical test of the a priori innovation of each of the satellites used by the filter, and wherein in the case when several satellites are declared as being faulty following the statistical test of their cross-innovation, the satellite not used by the filter having the largest number of a priori innovations, for which the statistical test is below a threshold, is invalidated, so that the raw measurement of said invalidated satellite is no longer used by the filters of the bank.

9. The method according to claim 1, wherein each of the filters of the bank provides a navigation solution by hybridizing inertial measurements to raw measurements of the signals transmitted by the satellites.

10. A satellite positioning device comprising a bank of Kalman filters each providing a navigation solution from raw measurements of signals transmitted by satellites, characterized in that it includes:
   a module for correcting the navigation state configured for
      determining for each satellite at least one likelihood ratio (lr, lr') between an assumption of a failure of a predetermined type of the satellite and an assumption of absence of failure of the satellite;
      comparing the likelihood ratio (lr, lr') associated with the failure of the predetermined type with a threshold value, and if required declaring the failure of the predetermined type;
   an accommodation module for estimating, for each filter of the bank, an error induced by the failure of a satellite on the navigation solution provided by the filter, and
   correcting, in the case of declaration of failure, the navigation solution according to the estimate of the error induced by the failure on the navigation solution;
   a module for detecting satellite failures configured for
      calculating, for each filter of the bank, a cross-innovation reflecting the deviation between an observation corresponding to a raw measurement from a satellite not used by the filter and an a posteriori estimate of said observation from the navigation solution provided by the Kalman filter as corrected by the accommodation module, and
      conducting a statistical text of the cross-innovation in order to declare whether the satellite is faulty or not.

* * * * *

UNITED STATES PATENT AND TRADEMARK OFFICE
CERTIFICATE OF CORRECTION

| | | |
|---|---|---|
| PATENT NO. | : 9,291,714 B2 | Page 1 of 1 |
| APPLICATION NO. | : 13/821556 | |
| DATED | : March 22, 2016 | |
| INVENTOR(S) | : Sebastien Vourc'h | |

It is certified that error appears in the above-identified patent and that said Letters Patent is hereby corrected as shown below:

On the Title Page, in Item (56) under Foreign Patent Documents, at line 3, please delete "2170060" and insert -- 2120060 --

Signed and Sealed this
Twenty-third Day of August, 2016

Michelle K. Lee
*Director of the United States Patent and Trademark Office*